(12) United States Patent
Motonaka et al.

(10) Patent No.: US 7,074,008 B2
(45) Date of Patent: Jul. 11, 2006

(54) SMALL-SIZED HYDROELECTRIC GENERATOR

(75) Inventors: Hiroshi Motonaka, Gobo (JP); Yoshio Shiozaki, Gobo (JP)

(73) Assignee: Taiyo Kagaku Kabushiki Kaisha, Wakayama-ken (JP)

( * ) Notice: Subject to any disclaimer, the term of this patent is extended or adjusted under 35 U.S.C. 154(b) by 150 days.

(21) Appl. No.: 10/946,006

(22) Filed: Sep. 22, 2004

(65) Prior Publication Data

US 2005/0129503 A1    Jun. 16, 2005

(30) Foreign Application Priority Data

Dec. 11, 2003   (JP) .............................. 2003-412954

(51) Int. Cl.
*F01D 17/00*    (2006.01)

(52) U.S. Cl. ...................... 415/144; 415/156; 415/202

(58) Field of Classification Search ................ 415/202, 415/144, 156, 157
See application file for complete search history.

(56) References Cited

U.S. PATENT DOCUMENTS

| | | | | |
|---|---|---|---|---|
| 1,035,082 A | * | 8/1912 | Cachin | 415/20 |
| 2,889,117 A | * | 6/1959 | Wimpress | 239/124 |
| 5,505,587 A | * | 4/1996 | Ghetzler | 415/49 |

* cited by examiner

*Primary Examiner*—Ninh H. Nguyen
(74) *Attorney, Agent, or Firm*—Ronald E. Greigg

(57) ABSTRACT

A rotator with an impeller and a stator generating an induced voltage are arranged in a casing. The tap water flowing flows through a main passage, which has a first jet orifice facing the impeller, and rotates the impeller. A bypass running from the inflow port and passing around an outer periphery of the stator is provided. When the water pressure is high, a check valve closing the bypass is opened against a spring force and the water flows out to a drain port, while the impeller is stably rotated by a pressure of water jetted from a second jet orifice penetrating from the bypass to face the impeller, which pressure is in reverse proportion to a speed of flow inside the bypass.

2 Claims, 3 Drawing Sheets

SMALL-SIZED HYDROELECTRIC GENERATOR

BACKGROUND OF THE INVENTION

1. Field of the Invention

This invention relates to a small-sized hydroelectric generator for generating electricity by utilizing the water flow that runs inside a water pipe.

2. Description of the Prior Art

A conventional small-sized hydroelectric generator is known, in which electricity is generated by utilizing water flowing inside a water pipe for use as a source of electricity for controlling a valve of automatic hand washer or the other devices, or as a source of electricity for products using a dry battery, for example, by charging up a condenser or an accumulator.

A structure of the conventional small-sized hydroelectric generator is as follows. Namely, an inflow port connecting and communicating with the water pipe is formed at an end of a casing and an outflow port is formed on the other end thereof. An electricity generating section comprising a stator and a rotator is arranged inside the casing. An impeller is integrally mounted to the rotator so that the impeller may be rotated by the water flow coming from the inflow port. Thus the rotator is rotated to make the stator generate an induced voltage and electricity, while the water that is used to rotate the impeller is made to drain to the outflow port through a passage formed to go through the center part of the rotator. (See Patent Publication 2000-213446, for example.)

Patent Document 1:

Japanese Patent Publication 2000-213446

However, according to the conventional small-sized hydroelectric generator as mentioned above, since a whole quantity of water flowing inside the water pipe is applied to the impeller for use as a rotational energy for the rotator, the output voltage from the stator increases in proportion to the quantity of water flow, as shown in FIG. 4, whereby not only a constant and stable voltage may not be obtained but also the impeller and a shaft bearing which supports a medial axis of rotation of the rotator may be worn out for a short period of time when the generator is connected to the water pipe having much quantity of flow or having a high water pressure, because the impeller rotates at a higher speed than a necessity requires.

SUMMARY OF ADVANTAGES OF THE INVENTION

This invention is made in view of the above-mentioned problems, and the purpose of the invention is to provide a small-sized hydroelectric generator for obtaining a constant and stable output voltage even when a quantity of water flow is large or when a water pressure is high.

To achieve the above-mentioned purpose, the small-sized hydroelectric generator of this invention comprises a casing having an inflow port at one end and an outflow port at the other end, a rotator rotated integrally with an impeller and a stator for generating electricity by the rotation of the rotator arranged in the casing. A main passage which goes from the inflow port to the outflow port through a center part of the rotator, and a bypass which goes from the inflow port to the outflow port detouring around an outer peripheral side of the stator are provided as passages for water flow going from the inflow port to the outflow port. Inside the bypass, a check valve is arranged which is urged by a spring in a direction of stopping the water flow coming from the inflow port.

In the small-sized hydroelectric generator structured as mentioned above, a partition wall is arranged between the inflow port and the impeller to form a space as a water flow chamber between the inflow port and the partition wall. A first jet orifice is formed in a state that it opens toward the impeller from a part of the outer periphery of the water flow chamber through the outer peripheral part of the partition wall. The water flow chamber is made to communicate with the bypass. A second jet orifice is formed in a state that it opens toward the impeller from the passage section before reaching the check valve in the bypass penetrating the outer peripheral part of the partition wall.

The small-sized hydroelectric generator according to this invention comprises a casing having an inflow port at one end, an outflow port at the other end, a rotator rotated integrally with an impeller and a stator for generating electricity by the rotation of the rotator, which rotator and the impeller are arranged in the casing. In the small-sized hydraulic generator, a main passage which goes from the inflow port to the outflow port through a center part of the rotator, and the bypass which goes from the inflow port to the outflow port detouring around an outer peripheral side of the stator are provided as passages for water flow going from the inflow port to the outflow port. Inside the bypass, a check valve is arranged which is urged by a spring in a direction of stopping the water flow coming from the inflow port. Consequently, when the quantity of water flowing into the inflow port of the casing is small and the water pressure is lower than a force of the spring, the whole quantity of water is applied for rotation of the impeller through the main passage to rotate the rotator and to generate electricity.

When the quantity of water flowing into the inflow port of the casing is large and the water pressure becomes higher, the check valve inside the bypass is opened against the force of the spring, and the water flows out to a drain port through the bypass without being used for rotation of the impeller, or in other words, for generation of electricity. Consequently, since the quantity of water flowing in the main passage to be applied for rotation of the impeller is restricted, the impeller is prevented from rotating at a higher speed than a necessity requires so that the rotator may rotate stably to generate electricity.

Further, according to Claim 2 of this invention, a partition wall is arranged between the inflow port and the impeller to form a space as a water flow chamber between the inflow port and the partition wall. A first jet orifice is formed in a state that it opens toward the impeller from a part of the outer periphery of the water flow chamber penetrating the outer peripheral part of the partition wall. Furthermore, the water flow chamber communicates with the bypass, and a second jet orifice is formed in a state that it opens toward the impeller from the passage section before reaching the check valve in the bypass penetrating the outer peripheral part of the partition wall. Consequently, even when a water pressure of tap water flowing into the water flow chamber from the inflow port is low and the check valve provided in the bypass is closed, the impeller is rotated by the jet flow jetted from the first and second jet orifices to generate electricity.

Moreover, when the quantity of tap water flowing into the water flow chamber from the inflow port is large and the water pressure becomes high, the check valve is opened by the water pressure against the spring force so that part of the tap water may escape to the bypass side. Consequently, it is prevented that a larger quantity of water than a necessity requires flows to the impeller side as mentioned above. The injection pressure from the second jet orifice to the impeller is lowered in reverse proportion to the speed of flow inside the bypass, so that the total quantity of water flow from the first jet orifice, whose injection pressure becomes higher in proportion to the water pressure, and from the second jet orifice may be almost constant. Consequently, not only the rotation of the impeller is kept almost constant without rotating the impeller at a higher speed than a necessity requires and wear-and-tear of a shaft bearing part or the like is prevented, but also an output voltage from the stator becomes almost constant irrespective of the quantity of water flow flowing into the inflow port, so that the voltage may be stably used for an automatic hand washer, a power source for controlling valves of various devices, or other products using a dry battery.

DETAILED DESCRIPTION OF THE PREFERRED EMBODIMENT

Figure 1:
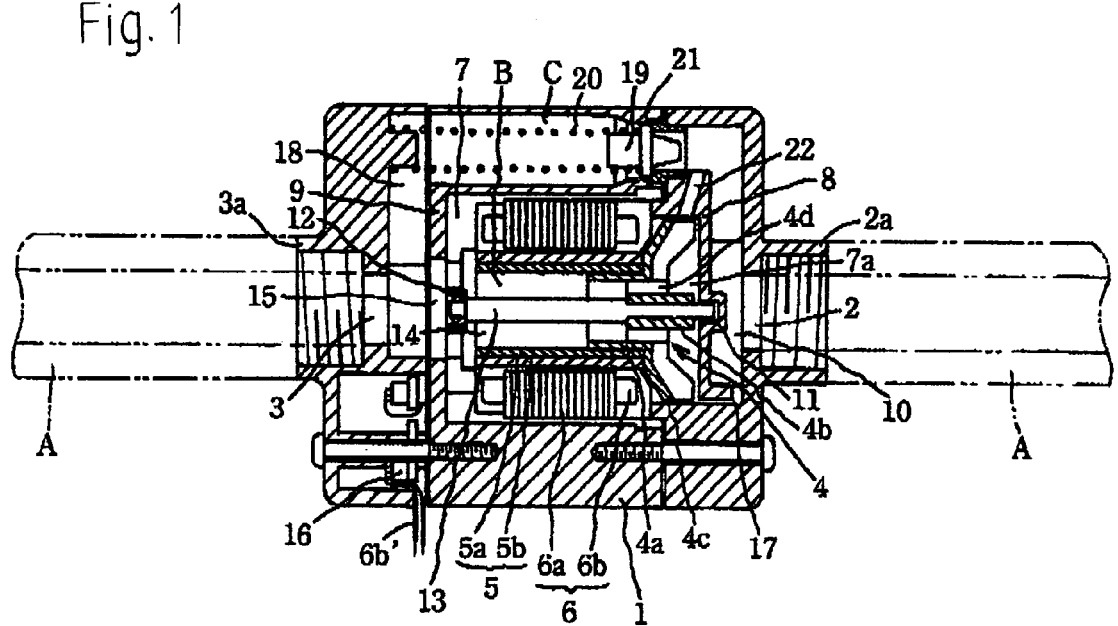
FIG. 1 is a longitudinal sectional side view of the small-sized hydroelectric generator mediating at an appropriate place of the water pipe.

Now, the specific embodiment of the invention is explained hereinafter based on the drawings. A casing 1, being a main body of the small-sized hydroelectric generator, is a hollow casing. An inflow port 2 and an outflow port 3 for tap water are formed in a center of one end and in a center of the other end of the casing 1, respectively, and a rotator 5 rotating integrally with an impeller 4, and a stator 6 generating electricity by the rotation of the rotator 5, are arranged in the center part of the inside of the casing 1.

The inflow port 2 and the outflow port 3 are formed to have inner diameters substantially same as an inner diameter of a water pipe A. Short cylindrical connection opening parts 2a, 3a, having diameters larger than those of the inflow port 2 and the outflow port 3, respectively, are mounted to project from circumferences of the inflow port 2 and the outflow port 3, respectively. By screwing an outer peripheral surface of the end parts of the water pipe A into the connection opening parts 2a, 3a, the connection opening parts 2a, 3a are made to intervene at appropriate lengthwise positions of the water pipe A in a state of connection and communication.

A housing chamber 7 for housing an electricity generating section comprising the rotator 5 and the stator 6 is provided in the center part of the inside of the casing 1. Partition walls 8, 9 are provided at openings on both ends of the housing chamber 7, respectively. A space between the partition wall 8 on the end and a wall surface of the casing 1 provided at the inflow port 2 is formed to be a water flow chamber 10. Shaft bearing parts 11, 12 are provided at center parts of facing surfaces of the partition walls 8, 9, respectively, so that they may rotatably bear both ends of a rotational medial axis 13 of the impeller 4.

The impeller 4 comprises outer and inner double cylindrical parts 4a, 4b which are integrally provided in the center part thereof, a ring-shaped wall part for connecting the cylindrical parts 4a, 4b to each other, a flow hole 4d which is formed in the ring-shaped wall part to penetrate the inner and outer surfaces of the ring-shaped wall part, and a plurality of blades 4c mounted to project radially in an outward direction from an end of an opening part of the outer cylindrical part 4a.

An end part of the rotational medial axis 13 is inserted into, engaged with and fixed to the inner cylindrical part 4b so that the impeller 4 may be rotated inside the end opening part 7a on one side of the housing chamber 7. The outer cylindrical part 4a is inserted into, engaged with and fixed to the inside of an end of a cylindrical yoke 6a of the rotator 5 which comprises the cylindrical yoke 5a and a magnet 5b mounted on an outer peripheral surface of the cylindrical yoke 5a, so that the impeller 4 and the rotator 5 may rotate together in an integrated manner. The inside of the cylindrical yoke 5a is formed to be a flow passage 14, one end of which communicates with the flow hole 4d of the impeller 4. The other end of the flow passage 14 communicates with the outflow port 3 through an outflow hole 15, which is formed in a center part of the partition wall 9 on the other end.

The stator 6 constituting the electricity generating part together with the rotator 5 comprises a core 6a and a coil 6b wound around the core 6a. The stator 6 surrounds the outer peripheral surface of the rotator 5 and is fixed to an inner peripheral surface of the housing chamber 7. A lead wire 6b' taken out from the coil 6b is led outside through a converter 16, which is arranged in the other end part of the casing 1 to convert alternating current to direct current. Then the lead wire 6b' is connected to a valve or the like of an automatic hand washer or various kinds of devices.

Figure 2:
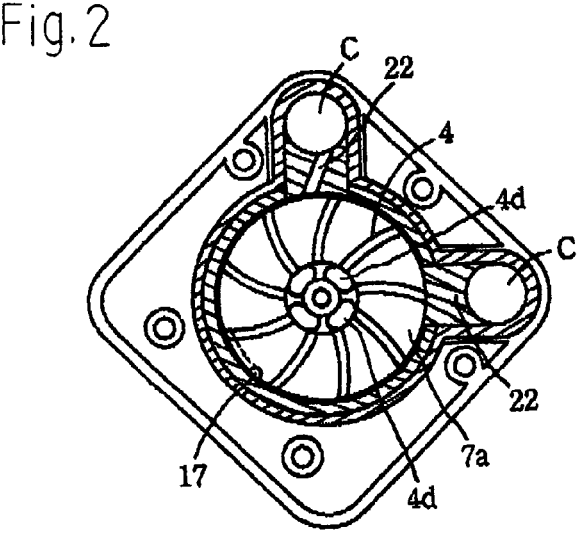
FIG. 2 is a longitudinal sectional front view of the impeller section.

The water flow chamber 10 is formed by the space between a sidewall surface of an end of the casing 1 having the inflow port 2, and the partition wall 8 on the end in the casing 1. The water flow chamber 10 communicates with the end opening part 7a of the housing chamber 7 having the impeller 4, via the first jet orifice 17 formed in an outer peripheral part of the partition wall 8. The first jet orifice 17 comprises a groove, which is spirally inclined from the water flow chamber 10 to the housing chamber 7 in a direction of rotation of the impeller 4, as indicated by a dotted line in FIG. 2. An end of the opening of the jet orifice faces a front-end part of the impeller 4 at a right angle. A passage going from the inflow port 2 to the outflow port 3 through the water flow chamber 10, the first jet orifice 17, the impeller 4, a flow passage 14 and the outflow hole 15 in the cylindrical yoke 5a, in this order, constitutes a main passage B.

Further, two bypasses C, C are provided to run from the inflow port 2 to the outflow port 3 through the water flow chamber 10, while deviating the outer peripheral side of the stator 6. More particularly, these bypasses C, C are arranged in parallel at an appropriate interval in the outer peripheral part of the housing chamber 7 of the electricity generating section of the casing 1, coming from two places of the outer peripheral part of the water flow chamber 10. The other ends of these bypasses C, C, communicate with the outflow port 3 through a flow passage 18 formed between the partition wall 9 of the housing chamber 7 and the sidewall surface of the casing 1.

A check valve 19 for opening and closing the bypass C is arranged in each bypass C. A spring 20 is arranged between the check valve 19 and the end sidewall surface of the casing 1 in a state of compression. The check valve 19 is urged by the spring 20 in a direction for stopping the water flow from the inflow port 2, and is fitted to a valve seat 21 under pressure.

A second jet orifice 22 is provided in a manner that it opens toward the impeller 4 at an angle from a passage section before reaching the check valve 19 in the bypass C from the water flow chamber 10 penetrating the outer peripheral part of the partition wall 8.

The second jet orifice 22 has a diameter smaller than that of the bypass C, and branches off from the bypass C at a right angle or at a substantially right angle to a longitudinal direction of the bypass C. Accordingly, a water pressure inside the second jet orifice 22 lowers in reverse proportion to a speed of flow of the tap water flowing inside the bypass C so that the speed of flow (quantity of flow) of the water flowing through the second jet orifice 22 may lower.

Now, a mechanism of the small-sized hydroelectric generator as structured above is described hereinafter. First, the small-sized hydroelectric generator is connected to an appropriate place of the water pipe A to communicate therewith. In other words, an appropriate place of the water pipe A is decoupled, the decoupled opening part on the upstream side of the water pipe A is connected to a connection opening part 2a of the inflow port 2 of the casing 1, and the decoupled opening part on the downstream side of the water pipe A is connected to a connection opening part 3a of the outflow port 3.

In this state, when the tap water flows through the water pipe A, the tap water flows from the inflow port 2 into the water flow chamber 10 and fills the water flow chamber 10. Then the tap water shunts to the main passage B and the bypass C. The impeller 4 is rotated by the water flow injected from the first jet orifice 17 on the side of the main passage B, and an alternating voltage is generated on the coil 6b of the stator 6 by the rotation of the rotor 5, which is integrated with the impeller 4. The alternating voltage is converted to a direct current by the converter 16, and is taken out via a lead wire 6b' to be used as a power source. The water flow used as a rotation energy for the impeller 4 passes through the flow passage 14 of the main passage B, and flows out from the outflow port 3 to the water pipe A on the downstream side.

When the water pressure of the tap water flowing through the bypasses C, C is lower than a pressure of the spring 20 pressing the check valve 19 arranged in the bypass C, the bypass C is kept closed by the check valve 19. Accordingly, the tap water does not flow through the bypass C. However, since the passage section before reaching the check valve 19 in the bypass C is provided with the second jet orifice 22 opening toward the impeller 4, the impeller 4 is rotated by the water jet injected from the second jet orifice 22 and by the water jet injected from the first jet orifice 17 on the side of the main passage B so that the alternating voltage may be generated on the stator 6 by the rotation of the rotor 5, which is integrated with the impeller 4, to generate the electricity as mentioned above.

After the water jet injected from the second jet orifice 22 is used as the rotation energy for the impeller 4, the water jet joins the water jet coming from the first jet orifice 17 inside the flow passage 14, which runs from the end opening part 7a of the housing chamber 7 having the impeller 4 in it, to the cylindrical yoke 5a of the rotor 5. Then the water jet flows out from the outflow port 3 to the water pipe A on the downstream side.

Figure 3:
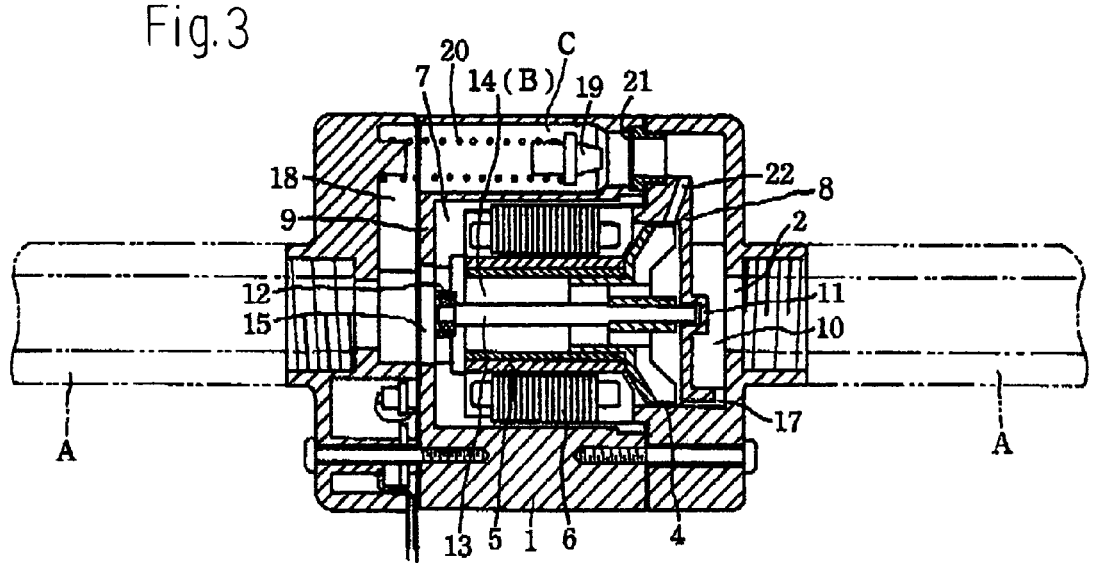
FIG. 3 is a longitudinal sectional side view of the check valve in an opened state.

When the water pressure inside the water flow chamber 10 in the casing 1 becomes larger than the pressure of the spring 20 pressing the check valve 19 due to large quantity of water flowing inside the water pipe, the tap water flowing into the bypasses C, C presses and opens the check valve 19 by the water pressure against the force of the spring 20, as shown in FIG. 3, and then it flows through each bypass C and flows out from the outflow port 3 into the water pipe. Also in this case, the tap water is injected from the first jet orifice 17 on the side of the main passage B to the impeller 4 by an injection force according to the pressure inside the water flow chamber 10, and the tap water is also injected from the second jet orifice 22 on the side of the bypasses C, C to the impeller 4 to rotate it, so that electricity may be generated by the rotator 5 and the stator 6. However, the second jet orifice 22 is branched off from the bypass C at a right angle to the longitudinal direction of the bypass C, or in a state of being inclined from the bypass C to the impeller 4 in a direction of the water flow. Consequently, as the speed of flow of the tap water flowing through the bypass C becomes higher, the water pressure inside the jet orifice 22 becomes lower.

Figure 4:
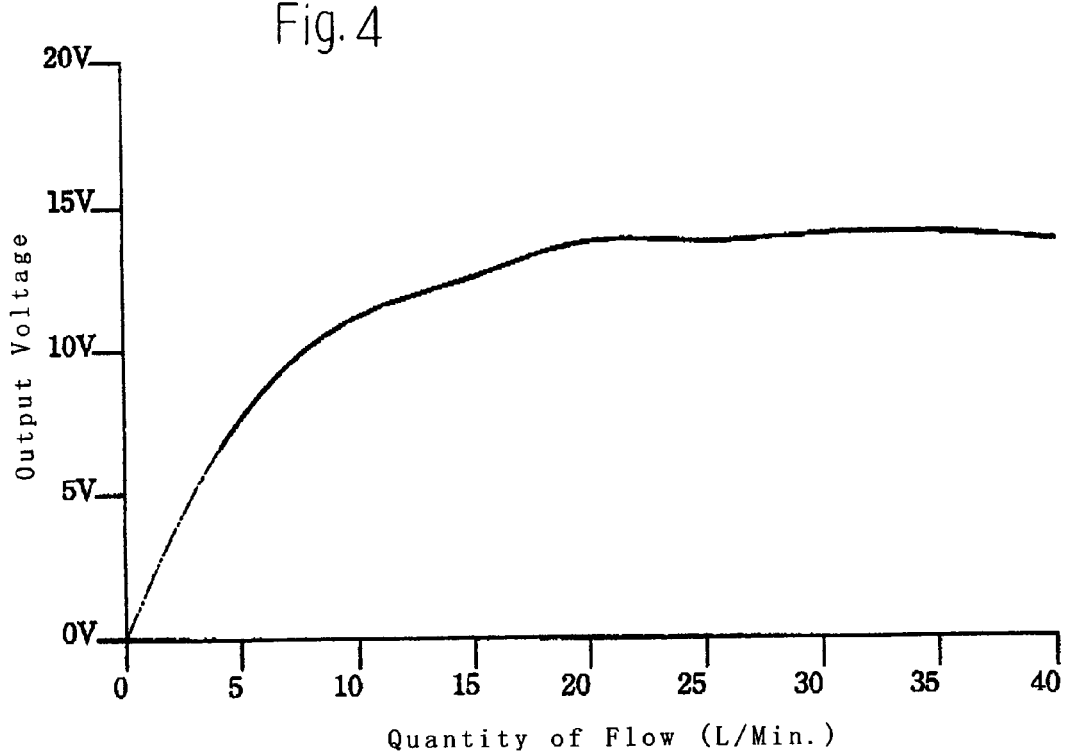
FIG. 4 is a line graph showing the relationship between the quantity of water and the output voltage according to the small-sized hydroelectric generator of this invention.
Figure 5:
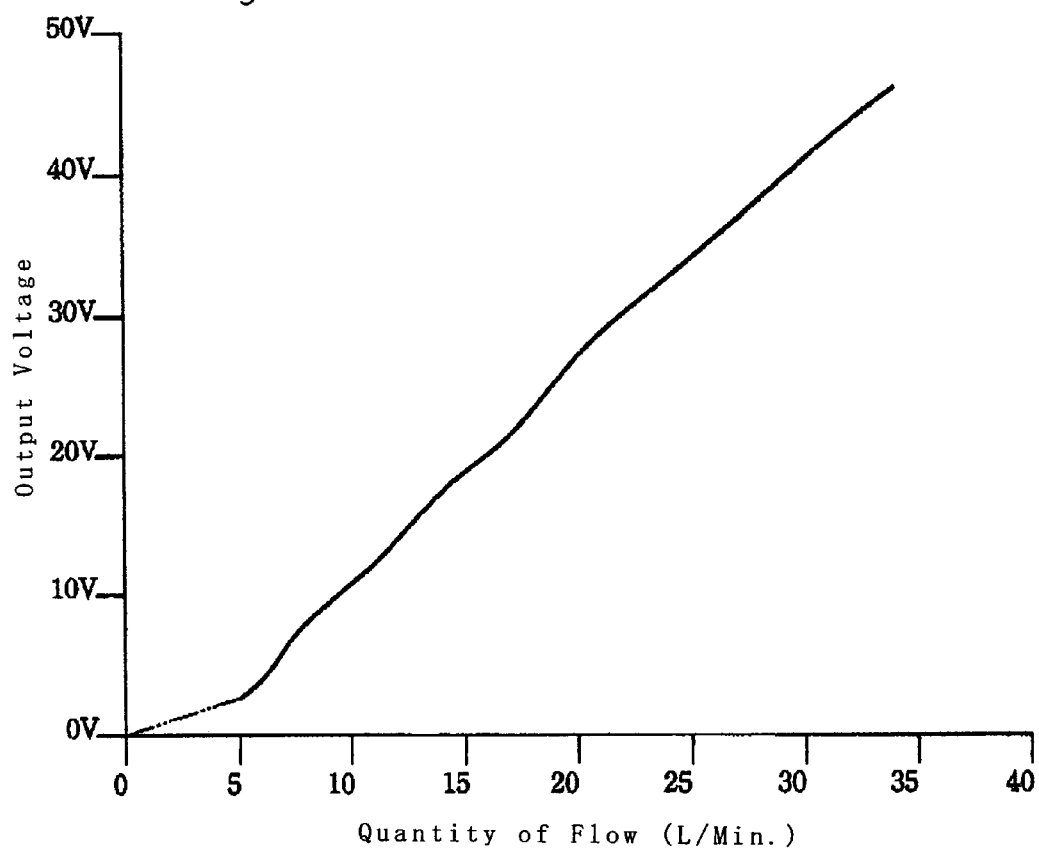
FIG. 5 is a line graph showing the relationship between the quantity of water and the output voltage according to a conventional small-sized hydroelectric generator.

Therefore, as the quantity of tap water flowing into the inflow port 2 of the casing 1 increases and the pressure becomes higher, the pressure of the jet flow jetted from the first jet orifice 17 on the side of the main passage A becomes higher. In the meanwhile, on the side of the bypass C, the pressure of the jet flow jetted from the second jet orifice 22 becomes lower. Consequently, total pressure of the jet flow jetted from the first and second jet orifices 17, 22 for rotating the impeller 4 stays constant. Accordingly, virtually irrespective of the quantity of flow of the tap water flowing into the inflow port 2, the impeller 4 is rotated at an almost constant rotational speed, and an almost constant output voltage is obtained from the stator 6, as shown in FIG. 4.

Thus, in a state that the inflow port 2 and the outflow port 3 of the small-sized hydroelectric generator are connected to the pipe line of the water pipe A, when the tap water flows into the casing 1 from the inflow port 2, the impeller 4 is rotated by the water flow to rotate the rotor 5, which is integrated with the impeller 4, so that the voltage may be generated on the rotator 6. Then the electricity is taken outside for use as the source of electricity.

In this case, a main passage B and the bypass C are provided as water flow passages from the inflow port 2 to the outflow port 3. The main passage B runs from the inflow port 2 to the outflow port 3 through the center part of the rotator 5, and the bypass C runs around the outer periphery side of the rotator 6 and reaches the outflow port 3. The tap water flowing into the inflow port 2 is driven to flow out of the outflow port 3 through the passage B and the bypass C. However, since the bypass C is closed by the check valve 19, when the quantity of water flowing into the inflow port 2 is small and its water pressure is low, in other words, when the water pressure is lower than the spring force pressing the check valve 19, the bypass C is kept closed by the check valve 19 and the tap water passes only through the main passage B. Consequently, all the tap water flowing into the inflow port 2 may be used as a rotational energy for the impeller 4 to rotate the rotator 5 so that the electricity may be generated.

On the contrary, when the quantity of water flowing into the inflow port 2 is large and the water pressure is high, the check valve 19 inside the bypass C is pushed and opened by the water pressure against the spring force, and the water flow flowing inside the bypass C flows out to a drain port without being used for rotation of the impeller 4. Accordingly, the quantity of water flowing in the main passage B is restricted without being increased in proportion to the quantity of water flowing into the inflow port 2, so that the quantity and pressure of the water supplied for the rotation of the impeller 4 may be reduced. Consequently, the rotator 5 may be rotated stably to generate the electricity.

Further, the first jet orifice 17 is formed to inject the water coming through the inflow port 2 to the main passage B to rotate the impeller 4, and the second jet orifice 22 is formed to inject the water from the passage section before reaching the check valve 19 in the bypass C to the impeller 4. By forming these jet orifices, even when the water pressure is low and the check valve 19 is closed, the impeller 4 is rotated by the water jet injected from these first and second jet orifices 17, 22 and the electricity is generated. In addition, the second jet orifice 22 has a diameter smaller than that of the bypass C, and is branched off from the bypass C at a right angle or at a substantially right angle with respect to the bypass C. Therefore, in a state that the check valve 19 is opened under a high water pressure, the pressure of injection from the second jet orifice 22 to the impeller 4 is lowered in reverse proportion to the speed of flow inside the bypass C. Consequently, the total of the quantity of water coming from the second jet orifice 22 and the quantity of water coming from the first jet orifice 17, whose injection pressure increases in proportion to the water pressure, becomes substantially constant, and the output voltage from the stator 6 becomes constant irrespective of the quantity of flow flowing into the inflow port 2.

What is claimed is:

1. In a small-sized hydroelectric generator for generating electricity by having an impeller rotate by means of water flow, which has a casing provided with an inflow port at an end and an outflow port at the other end of the casing, an impeller, a rotator rotating integrally with the impeller, and a stator generating electricity arranged in the casing, the hydroelectric generator comprising;

a main passage running from the inflow port through a center part of the rotator to the outflow port as water flow passages, a bypass running around an outer peripheral side of the stator from the inflow port to the outflow port, and a check valve provided inside the bypass which is urged by a spring in a direction of stopping a flow of water from the inflow port.

2. The small-sized hydroelectric generator as claimed in claim 1, further comprising;

a partition wall arranged between the inflow port and the impeller, a water flow chamber being a space formed between the inflow port and the partition wall, a first jet orifice formed to open from a part of an outer periphery of the water flow chamber to the impeller through an outer peripheral part of the partition wall, and a second jet orifice formed to open from a passage section before reaching the check valve in the bypass, which communicates with the water flow chamber, to the impeller penetrating the outer peripheral part of the partition wall.

\* \* \* \* \*